United States Patent [19]
Yamauchi et al.

[11] Patent Number: 4,842,614
[45] Date of Patent: Jun. 27, 1989

[54] DEMINERALIZATION OF AQUEOUS LIQUID DYE COMPOSITION

[75] Inventors: Noriaki Yamauchi, Hirakata; Kunihiko Imada, Sakai; Yutaka Kayane, Ibaraki, all of Japan

[73] Assignee: Sumitomo Chemical Company, Limited, Osaka, Japan

[21] Appl. No.: 39,954

[22] Filed: Apr. 20, 1987

[30] Foreign Application Priority Data

Apr. 30, 1986 [JP] Japan ................................ 61-101329
Jun. 3, 1986 [JP] Japan ................................ 61-128805

[51] Int. Cl.⁴ .............................................. C09B 67/00
[52] U.S. Cl. ............................................ 8/564; 8/604
[58] Field of Search ................................. 8/604, 564

[56] References Cited

U.S. PATENT DOCUMENTS

| | | | |
|---|---|---|---|
| 3,963,430 | 6/1976 | Nonn .................................. | 8/39 R |
| 4,500,321 | 2/1985 | Hugelshofer ......................... | 8/527 |
| 4,581,036 | 4/1986 | Opitz .................................. | 8/527 |

FOREIGN PATENT DOCUMENTS 61-5517  3/1986  Japan .

*Primary Examiner*—John F. Niebling
*Assistant Examiner*—Isabelle Rodriguez
*Attorney, Agent, or Firm*—Stevens, Davis, Miller & Mosher

[57] ABSTRACT

An aqueous liquid composition containing a reactive dye of the following formula

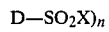

$$D-SO_2X)_n$$

wherein D is an organic dye residue having 1 to 3 sulfonic acid grups, X is a group of $-CH=CH_2$ or $-CH_2CH_2Y$ in which Y is a splittable group by the action of an alkali, and n is a number of 1 or 2, in an amount of 5 to 50% by weight based on the weight of the composition, which composition is improved in storage stability at a low temperature, is produced by preparing an undemimeralized agueous solution of the dye of the above formula, dissolving at least one additive selected from lactams and aminoalcohols in the solution, controlling the resulting solution to a temperature of $-10°$ C. to $5°$ C. to crystallized inorganic salts contained therein, and separating the crystallized inorganic salts, the said additive being used in an amount of 0.1 to 20% by weight based on the weight of the composition.

10 Claims, No Drawings

DEMINERALIZATION OF AQUEOUS LIQUID DYE COMPOSITION

The present invention relates to a process for demineralization of an aqueous liquid composition containing vinylsulfone type reactive dyes, and to an aqueous liquid dye composition improved in storage stability at a low temperature.

The vinylsulfone type reactive dyes of the following formula (I), $$D\text{—}(SO_2X)_n \qquad (I)$$

wherein D is an organic dye residue having 1 to 3 sulfonic acid groups, X is a group of $-CH=CH_2$ or $-CH_2CH_2Y$ in which Y is a splittable group by the action of an alkali, and n is a number of 1 or 2, have been widely used for dyeing or printing fiber materials, particularly cellulose fiber materials because of their excellent dye performances.

Industrial dyeing or printing of fiber materials using such reactive dyes has been carried out usually in an aqueous medium. Therefore, the reactive dyes commercially available in the form of powder or granule must be dissolved in the aqueous medium using hot water, when used for the dyeing or printing.

In recent years, dyeing or printing systems in a dye house have been actively mechanized and automated in many aspects, and therefore the reactive dyes have been eagerly required to be made into a form suitable for automatic weighing and dispensing systems.

An aqueous liquid composition of the reactive dye is now considered to be very favorable, because it is suitable for the automatic weighing and dispensing systems and causes no powder-scattering on the handling, resulting in no pollution of a working environment, and moreover it can serve saving energy and labor. Thus, it has been required to form the reactive dye into an aqueous liquid composition without any problem from industrial point of view.

In general, however, although the reactive dye-containing aqueous liquid composition is relatively stable at ordinary temperatures, it is natural that in the winter the aqueous liquid composition is allowed to stand at a temperature of 5° C. or lower through manufacturing, custody, transportation, shipment, storage or the like, so that the reactive dye contained therein lowers its solubility and then precipitates. If the precipitate-containing liquid composition is used as it is for the dyeing or printing, there are caused problems due to inaccuracy of the weighing as well as troubles such as pipe-stopping of automatic weighing and dispensing devices. While, in order to dissolve the precipitate, it is necessary to heat the liquid composition to a temperature of above 80° C. In this case, however, there are many problems to be solved with respect to the operation and stability of the reactive dye per se at such a high temperature.

In order to solve such problems and prevent from such troubles, it seems effective to remove inorganic salts such as sodium chloride, sodium sulfate and the like, which are by-produced in a large amount through the production process of the reactive dyes in a conventional manner.

There are many attempts to remove the inorganic salts contained in the reactive dyes. For example, Published Unexamined Japanese Patent Application No. 133263/1984 proposed a demineralization method using a reverse osmotic membrane. According to this method, however, it is very difficult to remove sodium sulfate which is usually by-produced through a conventional production process of the reactive dyes, and this method is not efficient from economical point of view.

Further, Published Unexamined Japanese Patent Application No. 12937/1979 proposed a removal of sodium sulfate by electrodialysis. However, it requires expensive equipments, and therefore it cannot be said to be economical as the industrial demineralization method.

Furthermore, there is known a so-called cooling method which takes advantage of differences in the solubility of inorganic salts depending on temperature. In carrying out this method, an aqueous dye solution containing inorganic salts (undemineralized dye solution) is cooled to allow temperature such as 5° to $-10°$ C. to crystallize and separate the inorganic salts. Therefore, there are problems such that the dyes per se are also crystallized when the dyes have a low solubility in water. For this reason, the so-called cooling method cannot be always applied for any different kind of the reactive dyes.

Of these demineralization methods all having problems to be solved, the so-called cooling method seems favorable from an industrial point of view. However, the cooling method can be applied only for the demineralization of reactive dyes having a high solubility even at a low temperature such as 5° C. or lower. If this method is applied for the demineralization of reactive dyes having an insufficient solubility in water, the reactive dyes are crystallized together with the inorganic salts, so that selective separation of the inorganic salts from the dye solution cannot be attained. If the dye content in the aqueous solution is decreased to a degree lower than its solubility at a certain temperature at which the cooling is effected, it is natural that the content of inorganic salts becomes low, so that an efficient demineralization cannot be attained and moreover the resulting aqueous solution should be concentrated to obtain an aqueous liquid dye composition having a dye content sufficient for the practical use. This is troublesome and inefficient as an industrial demineralization.

The present inventors have undertaken extensive studies to solve the problems described above and to find a demineralization process of the vinylsulfone type reactive dye-containing aqueous liquid composition according to the so-called cooling method, and found the fact that the object can be accomplished by use of lactams or aminoalcohols. The inventors have also found the fact that the storage stability of the vinylsulfone type reactive dye-containing aqueous liquid composition, wherein the reactive dye is the one manufactured in a manner producing sodium sulfate as a by-product, can be improved by controlling a sodium sulfate content to a specific degree or less.

The present invention provides a process for producing an aqueous liquid composition containing the vinylsulfone type reactive dye of the above formula (I) in an amount of 5 to 50% by weight based on the weight of the composition, which comprises steps of preparing an undemineralized aqueous solution of the reactive dye of the formula (I), dissolving at least one additive selected from lactams and aminoalcohols in the solution, controlling the resulting solution to a temperature of $-10°$ C. to 5° C. to crystallize inorganic salts contained therein, and separating the crystallized inorganic salts, the additive being used in an amount of 0.1 to 20% by weight based on the weight of the composition.

The present invention also provides an aqueous liquid composition comprising 5 to 50% by weight of the reactive dye of the above formula (I) manufactured in a known manner producing sodium sulfate as a by-product and 0.1 to 20% by weight of at least one member selected from lactams and aminoalcohols, a content of sodium sulfate being 2.5% by weight or less based on the weight of the composition, and the balance being water.

In the present invention, the term "demineralization" is intended to mean a removal of inorganic salts, particularly sodium sulfate, which are by-products produced in the course of production process of the reactive dyes.

The reactive dyes of the formula (I) are known and can be manufactured in a manner known per se. The organic dye residue having 1 to 3 sulfonic acid groups represented by D includes any residue of monoazo dyes, polyazo dyes including disazo dyes, metal complex monoazo or disazo dyes, metal formazan dyes, anthraquinone dyes, metal phthalocyanine dyes, stilbene dyes, oxazine dyes, dioxazine dyes, triphenylmethane dyes, phenazine dyes, xanthene dyes, thioxanthene dyes, naphthoquinone dyes, pyrenequinone dyes, perilenetetracarboimide dyes, nitro- or azomethine dyes and the like. The metal in the metal complex azo, metal formazan and metal phthalocyanine dyes includes Cu, Cr, Co, Ni, Fe and the like.

The splittable group represented by Y includes, for example, sulfuric acid ester group, thiosulfuric acid ester group, phosphoric acid group, acetic acid ester group and halogen atoms.

The demineralization process of the present invention can be effectively applied for any reactive dye represented by the formula (I), particularly for the reactive dyes of this kind having a low solubility in water. Examples of the reactive dyes are given as follows in each free acid form.

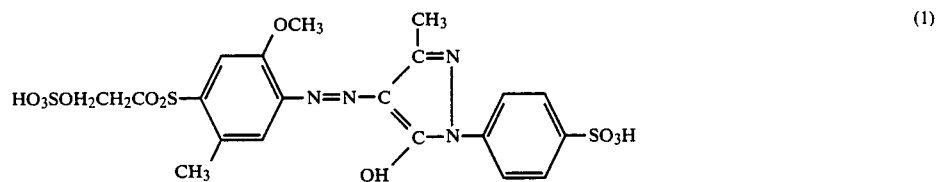

(1)

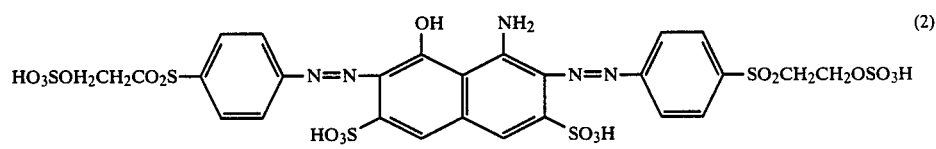

(2)

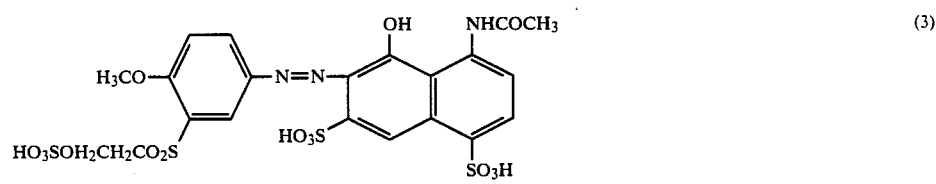

(3)

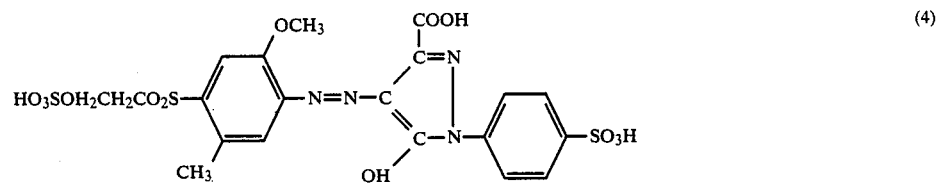

(4)

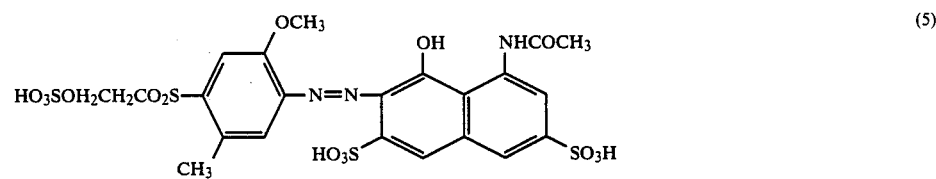

(5)

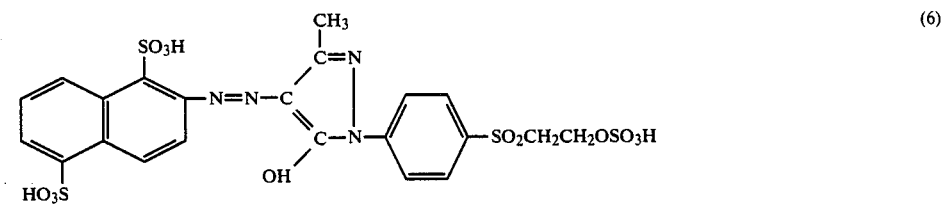

(6)

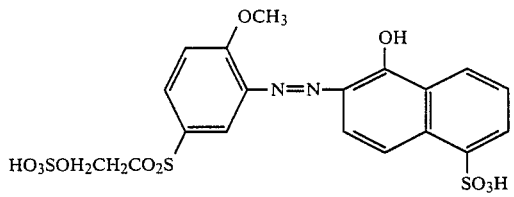

(7)

The lactams usable in the present invention includes, for example, ε-caprolactam, γ-caprolactam, δ-caprolactam, γ-valerolactam, γ-butyrolactam and the like. Of these, particularly preferred is ε-caprolactam.

The aminoalcohols usable in the present invention includes, for example, triethanolamine, diethanolamine, monoethanolamine, glycolic acid salt of triethanolamine and the like. Of these, particularly preferred is triethanolamine.

In carrying out the process of the present invention, an undemineralized aqueous solution of the reactive dye (I) is prepared. For this purpose, a reactive dye-containing reaction mixture obtainable through a conventional method already known for the production of the reactive dye (I) may be used as it is. When the reaction mixture contains too large amount of water, the dye content can be controlled in a manner such that the reaction mixture may be concentrated, for example, by evaporation of a part of water in vacuo, or the reactive dye powder obtainable by drying a part of the reaction mixture may be mixed with the remaining reaction mixture. Alternatively, a wet cake obtainable through conventional manners such as salting out of the reaction mixture and filtration, or a powder obtainably by drying the wet cake, may be used by dissolving it in a predetermined amount of water.

Then, at least one member selected from lactams and aminoalcohols is added into the aqueous dye solution prepared above to form a clear solution. Successively, the clear solution is controlled to a temperature of 5° to −10° C. and allowed to stand for 1 to 10 hours, thereby crystallizing inorganic salts contained therein. The crystallized inorganic salts are then separated from the aqueous dye solution by, for example, filtration or the like.

The amount of the lactams and/or aminoalcohols is 0.1 to 20% by weight, preferably 0.5 to 8% by weight, based on the weight of the aqueous liquid dye composition. The lactam and/or aminoalcohol may be added to the aqueous dye solution in all of the amount defined above prior to the crystallization and separation of the inorganic salts. Alternatively, a part thereof may be used after the crystallization and separation.

The thus obtained aqueous liquid composition can be preferably controlled within a pH range of 3 to 7 by the addition of a mineral acid or an alkali.

For the production of the reactive dye (I)containing aqueous liquid composition having a sodium sulfate content of 2.5% by weight or less, the control of the sodium sulfate content can be carried out in any manner including demineralization using a reverse osmotic membrane, demineralization by electrodialysis, so-called cooling method or the like. Preferably, however, the control is carried out by the demineralization process of the present invention as described above to obtain a desired degree of the sodium sulfate content, preferably 2% by weight or less.

The aqueous liquid composition of the reactive dye (I) in accordance with the present invention may contain a pH buffer and other additives additionally.

The present aqueous liquid dye composition can be stably stored for a long period of time even at a low temperature such as 5° C. or lower. For example, it can be stored at 5° C. for 2 months without precipitation of the reactive dye (I).

Moreover, the present aqueous liquid dye composition can keep its low viscosity (about 10 cps or lower) for a long period of time, so that it can be applied to various kinds of automatic weighing and dispensing devices even after storage for a long period of time.

The present aqueous liquid dye composition can be used for dyeing or printing natural or synthetic fiber materials, particularly such as paper, cellulose fibers, polyamide fibers, wools and the like in a conventional manner, thereby giving dyed products which are equal to those obtainable using the reactive dye in the form of powder or granule.

The present invention is illustrated in more detail with reference to the following Examples, which are only illustrative and not intended to limit the scope of the present invention. In Examples, parts and % are by weight.

EXAMPLE 1

ε-Caprolactam (10 parts) was dissolved in a reaction mixture (990 parts) of a reactive dye having the above formula (1), which mixture had been obtained in a conventional manner and had a dye content of 20%, a sodium chloride content of 0.2% and a sodium sulfate content of 8.0%. The resulting clear solution was cooled to 0° C. and allowed to stand at this temperature for about 5 hours. The crystals precipitated were removed by filtration. During the procedure, no crystallization of the reactive dye appeared, and the separation of crystals of the inorganic salt was efficiently performed.

The demineralized dye solution (950 parts) having a dye content of 22%, a sodium chloride content of 0.2% and a sodium sulfate content of 1.8% was adjusted to pH 5.3 using 10% sulfuric acid and then made 1000 parts with water. A part of the resulting aqueous liquid dye composition was stored at 0° C. for 2 months, during which the solution state was kept stably without crystallization of the reactive dye.

EXAMPLE 2

ε-Caprolactam (10 parts) was dissolved in a reaction mixture (990 parts) of a reactive dye having the above formula (1), which mixture had been obtained in a conventional manner and had a dye content of 20%, a sodium chloride content of 0.2% and a sodium sulfate content of 8.0%. The resulting clear solution was cooled to 0° C. and allowed to stand at this temperature for about 5 hours. The crystals precipitated were removed by filtration. During the procedure, no crystallization of the reactive dye appeared, and the separation of crystals of the inorganic salt was efficiently performed.

The demineralized dye solution (950 parts) having a dye content of 22%, a sodium chloride content of 0.2%, a sodium sulfate content of 1.8% and an ε-caprolactam content of 1.1% was mixed with ε-caprolactam (19 parts), then adjusted to pH 5.0 using 10% sulfuric acid and then made 1000 parts with water. A part of the resulting aqueous liquid dye composition was stored at 0° C. for 2 months, during which the solution state was kept stably without crystallization of the reactive dye.

EXAMPLE 3

ε-Caprolactam (10 parts) was dissolved in a reaction mixture (990 parts) of a reactive dye having the above formula (2), which mixture had been obtained in a conventional manner and had a dye content of 24%, a sodium chloride content of 0.05%, a sodium sulfate content of 5.5% and a sodium acetate content of 0.3%. The resulting clear solution was cooled to 0° C. and allowed to stand at this temperature for about 5 hours. The crystals precipitated were removed by filtration. During the procedure, no crystallization of the reactive dye appeared, and the separation of crystals of the inorganic salt was efficiently performed.

The demineralized dye solution (970 parts) having a dye content of 26%, a sodium chloride content of 0.05% and a sodium sulfate content of 1.5% was adjusted to pH 5.0 using 10% sulfuric acid and then made 1000 parts with water. A part of the resulting aqueous liquid dye composition was stored at 0° C. for 2 months, during which the solution state was kept stably without crystallization of the reactive dye.

EXAMPLE 4

ε-Caprolactam (20 parts) was dissolved in a reaction mixture (980 parts) of a reactive dye having the above formula (3), which mixture had been obtained in a conventional manner and had a dye content of 15%, a sodium chloride content of 0.5% and a sodium sulfate content of 10%. The resulting clear solution was cooled to 0° C. and allowed to stand at this temperature for about 5 hours. The crystals precipitated were removed by filtration. During the procedure, no crystallization of the reactive dye appeared, and the separation of crystals of the inorganic salt was efficiently performed.

The demineralized dye solution (950 parts) having a dye content of 17%, a sodium chloride content of 0.5% and a sodium sulfate content of 2.0% was adjusted to pH 4.5 using 10% sulfuric acid and then made 1000 parts with water. A part of the resulting aqueous liquid dye composition was stored at 5° C. for 2 months, during which the solution state was kept stably without crystallization of the reactive dye.

EXAMPLE 5

Triethanolamine (10 parts) was dissolved in a reaction mixture (990 parts) of a reactive dye having the above formula (1), which mixture had been obtained in a conventional manner and had a dye content of 20%, a sodium chloride content of 0.2% and a sodium sulfate content of 8.0%. The resulting clear solution was cooled to 0° C. and allowed to stand at this temperature for about 5 hours. The crystals precipitated were removed by filtration. During the procedure, no crystallization of the reactive dye appeared, and the separation of crystals of the inorganic salt was efficiently performed.

The demineralized dye solution (950 parts) having a dye content of 22%, a sodium chloride content of 0.2%, a sodium sulfate content of 2.0% and a triethanolamine content of 1.1% was adjusted to pH 5.1 using 10% sulfuric acid and then made 1000 parts with water. A part of the resulting aqueous liquid dye composition was stored at 0° C. for 2 monts, during which the solution state was kept stably without crystallization of the reactive dye.

EXAMPLE 6

ε-Caprolactam (30 parts) was dissolved in a reaction mixture (970 parts) of a reactive dye having the above formula (4), which mixture had been obtained in a conventional manner and had a dye content of 22%, a sodium chloride content of 0.1% and a sodium sulfate content of 6.5%. The resulting clear solution was cooled to −3° C. and allowed to stand at this temperature for about 5 hours. The crystals precipitated were removed by filtration. During the procedure, no crystallization of the reactive dye appeared, and the separation of crystals of the inorganic salt was efficiently performed.

The demineralized dye solution (990 parts) having a dye content of 25%, a sodium chloride content of 0.1% and a sodium sulfate content of 1.5% was adjusted to pH 5.5 using 10% sulfuric acid and then made 1000 parts with water. A part of the resulting aqueous liquid dye composition was stored at 0° C. for 2 months, during which the solution state was kept stably without crystallization of the reactive dye.

EXAMPLE 7

ε-Caprolactam (20 parts) was dissolved in a reaction mixture (980 parts) of a reactive dye having the above formula (5), which mixture had been obtained in a conventional manner and had a dye content of 15%, a sodium chloride content of 0.7% and a sodium sulfate content of 8.5%. The resulting clear solution was cooled to 0° C. and allowed to stand at this temperature for about 5 hours. The crystals precipitated were removed by filtration. During the procedure, no crystallization of the reactive dye appeared, and the separation of crystals of the inorganic salt was efficiently performed.

The demineralized dye solution (950 parts) having a dye content of 17%, a sodium chloride content of 0.7% and a sodium sulfate content of 1.5% was adjusted to pH 4.8 using 10% sulfuric acid and then made 1000 parts with water. A part of the resulting aqueous liquid dye composition was stored at 5° C. for 2 months, during which the solution state was kept stably without crystallization of the reactive dye.

EXAMPLE 8

ε-Caprolactam (30 parts) was added to a reaction mixture (970 parts) of a reactive dye having the above formula (6), which mixture had been obtained in a conventional manner and had a dye content of 12%, a sodium chloride content of 0.8% and a sodium sulfate content of 10%. The resulting clear solution was cooled to 0° C. and allowed to stand at this temperature for about 5 hours. The crystals precipitated were removed by filtration. During the procedure, no crystallization of the reactive dye appeared, and the separation of crystals of the inorganic salt was efficiently performed.

The demineralized dye solution (950 parts) having a dye content of 14%, a sodium chloride content of 0.8% and a sodium sulfate content of 2.0% was adjusted to pH 5.0 using 10% sulfuric acid and then made 1000 parts with water. A part of the resulting aqueous liquid dye composition was stored at 5° C. for 2 months, during which the solution state was kept stably without crystallization of reactive dye.

EXAMPLE 9

A reaction mixture of a reactive dye having the above formula (7), which mixture had been obtained in a conventional manner and had a dye content of 17%, a sodium chloride content of 2.2% and a sodium sulfate content of 3.0%, was subjected to demineralization using a reverse osmotic membrane made up of polyacrylonitrile, whereby there was obtained a demineralized dye solution having a dye content of 22%, a sodium chloride content of 0.25 and a sodium sulfate content of 2.4%. The dye solution (900 parts) was mixed with ε-caprolactam (10 parts) and then with sodium acetate (5 parts) to form a clear solution. This solution was adjusted to pH 4.8 using 10% sulfuric acid and then made 1000 parts with water. A part of the resulting aqueous liquid dye composition was stored at 0° C. for 2 months, during which the solution state was kept stably without crystallization of the reactive dye.

What is claimed is:

1. A process for producing an aqueous liquid composition containing a reactive dye of the following formula, $$D\text{-}(SO_2X)_n$$

wherein D is an organic dye residue having 1 to 3 sulfonic acid groups, X is a group of $-CH=CH_2$ or $-CH_2CH_2Y$ in which Y is a splittable group by the action of an alkali, and n is a number of 1 or 2, in an amount of 5 to 50% by weight based on the weight of the composition, which comprises steps of preparing an undemineralized aqueous solution consisting essentially of the dye of the above formula and water, dissolving at least one additive selected from lactams and aminoalcohols in the solution, controlling the resulting solution to a temperature of $-10°$ C. to 5° C. to crystallize inorganic salts contained therein, and separating the crystallized inorganic salts, the said additive being used in an amount of 0.1 to 20% by weight based on the weight of the composition.

2. A process according to claim 1, wherein the organic dye residue having 1 to 3 sulfonic acid groups is a residue of monoazo dyes, polyazo dyes including diazo dyes, metal complex monoazo or disazo dyes, metal formazan dyes, anthraquinone dyes, metal phthalocyanine dyes, stilbene dyes, oxazine dyes, dioxazine dyes, triphenylmethane dyes, phenazine dyes, xanthene dyes, thioxanthene dyes, naphthaoquinone dyes, pyrenequinone dyes, perilenetetracarboimide dyes or nitro- or azomethine dyes.

3. A process according to claim 1, wherein the reactive dye is the one represented by the following formula in a free acid form,

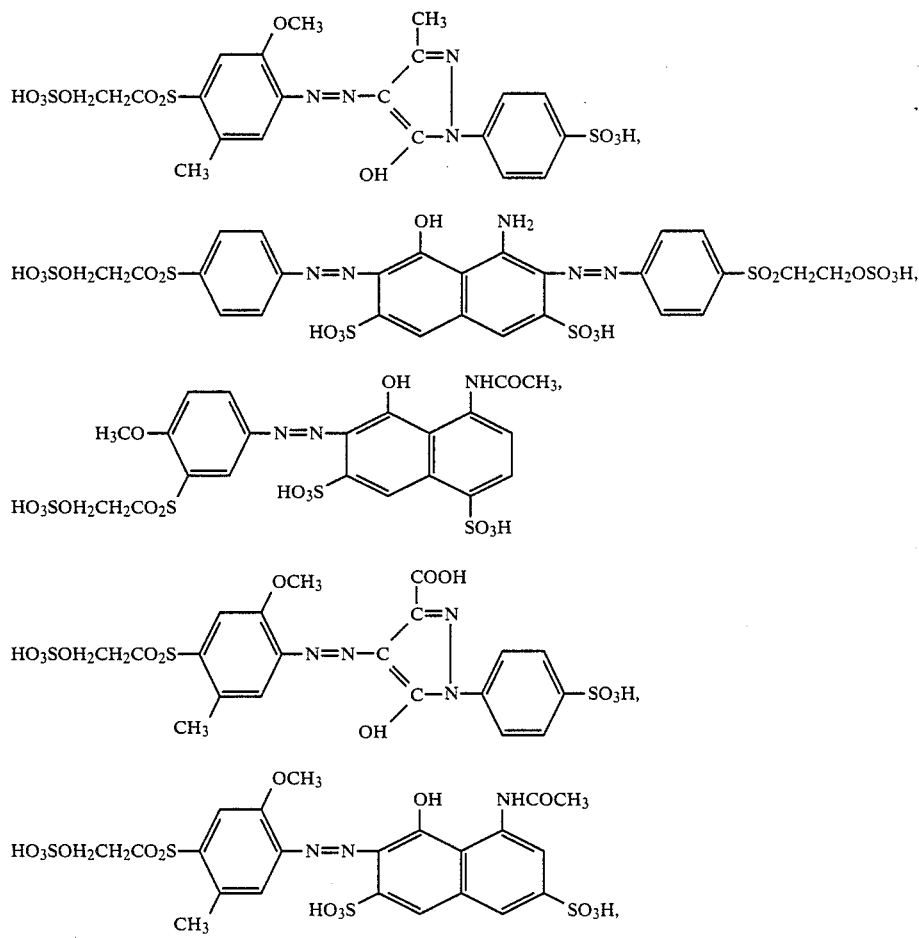

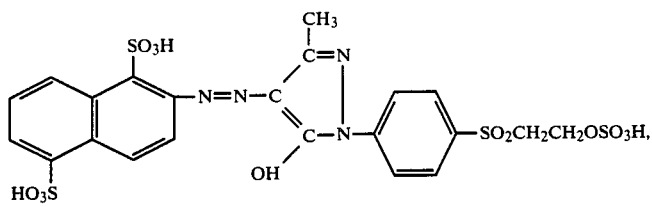

or

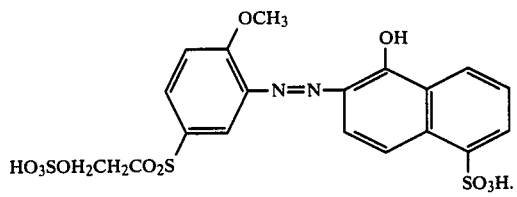

4. A process according to claim 1, wherein the lactam is ε-caprolactam, γ-caprolactam, δ-caprolactam, γ-valerolactam or γ-butyrolactam.

5. A process according to claim 1, wherein the aminoalcohol is triethanolamine, diethanolamine, monoethanolamine or glycoric acid salt of triethanolamine.

6. A process according to claim 1, wherein the aqueous liquid composition obtained after the step of separating inorganic salts is adjusted within a pH range of 3 to 7.

7. An aqueous liquid composition produced by the process of claim 1.

8. An aqueous liquid composition comprising 5 to 50% by weight of a reactive dye of the following formula, $$D-(SO_2X)_n$$

wherein D is an organic dye residue having 1 to 3 sulfonic acid groups, X is a group of $-CH=CH_2$ or $-CH_2CH_2Y$ in which Y is a splittable group by the action of an alkali, and n is a number of 1 or 2, which is manufactured in a known manner producing sodium sulfate as a by-product, and 0.1 to 20% by weight of at least one member selected from lactams and aminoalcohols, a content of sodium sulfate being 2.5% by weight or less based on the weight of the composition, and the balance being water.

9. An aqueous liquid composition according to claim 8, wherein the lactam is ε-caprolactam, γ-caprolactam, δ-caprolactam, γ-valerolactam or γ-butyrolactam.

10. An aqueous liquid composition according to claim 8, wherein the aminoalcohol is triethanolamine, diethanolamine, monoethanolamine or glycoric acid salt of triethanolamine.

* * * * *